(12) United States Patent
Takeda et al.

(10) Patent No.: US 11,546,917 B2
(45) Date of Patent: Jan. 3, 2023

(54) INTERFERENCE MITIGATION SCHEME FOR ASYNCHRONOUS TIME DIVISION DUPLEX

(71) Applicant: QUALCOMM INCORPORATED, San Diego, CA (US)

(72) Inventors: Kazuki Takeda, Tokyo (JP); Marco Papaleo, Bologna (IT); Alessio Marcone, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 112 days.

(21) Appl. No.: 17/115,779

(22) Filed: Dec. 8, 2020

(65) Prior Publication Data
US 2021/0185693 A1 Jun. 17, 2021

Related U.S. Application Data

(60) Provisional application No. 62/947,963, filed on Dec. 13, 2019.

(51) Int. Cl.
*H04W 72/08* (2009.01)
*H04W 76/10* (2018.01)
*H04L 5/14* (2006.01)

(52) U.S. Cl.
CPC ............. *H04W 72/082* (2013.01); *H04L 5/14* (2013.01); *H04W 76/10* (2018.02)

(58) Field of Classification Search
None
See application file for complete search history.

(56) References Cited

U.S. PATENT DOCUMENTS

| | | | | |
|---|---|---|---|---|
| 2015/0011233 A1* | 1/2015 | Kazmi | ................ | H04W 72/044 455/454 |
| 2015/0181583 A1* | 6/2015 | Siomina | .............. | H04W 72/044 370/330 |
| 2015/0333877 A1* | 11/2015 | Rahman | ................ | H04L 1/1812 370/280 |
| 2016/0316376 A1* | 10/2016 | Wen | ....................... | H04W 16/14 |
| 2017/0086170 A1* | 3/2017 | Takeda | .............. | H04W 72/1252 |
| 2018/0013594 A1* | 1/2018 | Mukkavilli | ........... | H04W 16/14 |
| 2018/0091282 A1* | 3/2018 | Lim | .................. | H04W 72/0406 |
| 2019/0380147 A1* | 12/2019 | Zhang | ............... | H04W 74/0816 |
| 2020/0067690 A1* | 2/2020 | Park | ................... | H04W 72/0453 |
| 2020/0154300 A1* | 5/2020 | Song | ................. | H04W 72/0446 |

FOREIGN PATENT DOCUMENTS

WO WO-2018172620 A1 * 9/2018

OTHER PUBLICATIONS

International Search Report and Written Opinion—PCT/US2020/064142—ISA/EPO—dated Feb. 4, 2021.

* cited by examiner

*Primary Examiner* — Jamaal Henson
(74) *Attorney, Agent, or Firm* — Haynes and Boone, LLP

(57) ABSTRACT

Wireless communications systems and methods related to reducing user equipment (UE)-to-UE cross-link interference are provided. A user equipment (UE) may receive from a base station (BS), a time-division-duplexing (TDD) pattern. The UE may establish a guard band on uplink resources from resources specified in the TDD pattern. Alternatively, the UE may reduce power to uplink resources from the resources specified in the TDD pattern. The UE transmits the resources using a carrier and as specified in the TDD pattern.

20 Claims, 9 Drawing Sheets

INTERFERENCE MITIGATION SCHEME FOR ASYNCHRONOUS TIME DIVISION DUPLEX

CROSS-REFERENCE TO RELATED APPLICATIONS

The present application claims priority to and the benefit of the U.S. Provisional Patent Application No. 62/947,963, filed Dec. 13, 2019, which is hereby incorporated by reference in its entirety.

TECHNICAL FIELD

This application relates to wireless communication systems, and more particularly to mitigating cross-link interference in asynchronous time division duplex (TDD) wireless communications.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long-term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

The UEs 115 associated with different networks, such as TDD networks may experience cross-link interference. The cross-link interference may occur when UEs 115 are transmitting on adjacent carriers and use different TDD patterns. This causes resources of different types specified in the TDD patterns to mis-align and create cross-link interference.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

A method for avoiding cross-link interference in a wireless communication, comprising receiving, by a first user equipment (UE) from a base station (BS), a second time-division-duplexing (TDD) pattern associated with a second UE, wherein the second TDD pattern specifies second resources that are on a carrier adjacent to a carrier of the first UE, establishing, by the first UE, a guard band on an edge of the carrier that includes at least one uplink resource from first resources specified in a first TDD pattern associated with the first UE when there is a resource type mismatch between the at least one uplink resource and at least one resource in the second resources, and transmitting, by the first UE to the BS, the first resources on the carrier and as specified in the first TDD pattern, including the at least one uplink resource with the guard band on the edge of the carrier carrying the at least one uplink resource The aspects are further directed to establishing, by the first UE, a second guard band on a portion of a specific resource from the first resources specified in the first TDD pattern, and wherein the transmitting further comprises transmitting the portion of the specific resource with the second guard band.

The aspects are further directed to monitoring, at the first UE, for an indicator that includes the second TDD pattern that is used by the second UE to transmit the second resources on the carrier adjacent to the carrier transmitting the first resources.

The aspects are further directed to determining, at the first UE, that the at least one uplink resource from the first resources specified in the first TDD pattern is aligned with at least one uplink resource from the second resources specified in the second TDD pattern, and transmitting the at least one uplink resource without the guard band when alignment exists between the at least one uplink resource specified in the first TDD pattern and the at least one uplink resource specified in the second TDD pattern.

The aspects are further directed to the first TDD pattern includes locations of the at least one uplink resource, at least one downlink resource, and at least one special resource in the first resources during a time period.

In an aspect of the disclosure, the user equipment (UE), comprises a transceiver configured to receive, from a base station (BS), a second time-division-duplexing (TDD) pattern associated with a second UE, wherein the second TDD pattern specifies second resources that are on a carrier adjacent to a carrier of the UE, and transmit, to the BS, first resources on the carrier of the UE and as specified in a first TDD pattern, including at least one uplink resource with a guard band on an edge of the carrier carrying the at least one uplink resource, and a processor configured to establish the guard band on the edge of the carrier that carries the at least one uplink resource from the first resources specified in the first TDD pattern associated with the UE when there is a resource type mismatch between the at least one uplink resource and at least one resource in the second resources.

The aspects are further directed to the processor is further configured to establish a second guard band on a portion of a specific resource from the first resources specified in the first TDD pattern, and to transmit the first resources the transceiver is further configured to transmit the portion of the specific resource with the second guard band.

The aspects are further directed to the processor is further configured to monitor for an indicator that includes the second TDD pattern that is used by the second UE to transmit the second resources on the carrier adjacent to the carrier transmitting the first resources.

The aspects are further directed to the processor is further configured to determine that the at least one uplink resource from the first resources specified in the first TDD pattern is aligned with at least one uplink resource from the second resources specified in the second TDD pattern, and to transmit the first resources, the transceiver is further configured to transmit the at least one uplink resource without the guard band when alignment exists between the at least one uplink resource specified in the first TDD pattern and the at least one uplink resource specified in the second TDD pattern.

The aspects are further directed to where the guard band reduces cross-link interference caused by the resource type mismatch.

In an aspect of the disclosure, a non-transitory computer-readable medium having program code recorded thereon, the program code comprising code for receiving, by a first user equipment (UE) from a base station (BS), a second time-division-duplexing (TDD) pattern associated with a second UE, wherein the second TDD pattern specifies second resources that are on a carrier adjacent to a carrier of the first UE, code for establishing, by the first UE, a guard band on an edge of the carrier that includes at least one uplink resource from first resources specified in a first TDD pattern associated with the first UE when there is a resource type mismatch between the at least one uplink resource and at least one resource in the second resources, and code for transmitting, by the first UE to the BS, the first resources on the carrier and as specified in the first TDD pattern, including the at least one uplink resource with the guard band on the edge of the carrier carrying the at least one uplink resource.

The aspects are further directed to code for establishing, by the first UE, a second guard band on a portion of a specific resource from the first resources specified in the first TDD pattern and wherein the code for transmitting further comprises code for transmitting the portion of the specific resource with the second guard band.

The aspects are further directed to code for monitoring, at the first UE, for an indicator that includes the second TDD pattern that is used by the second UE to transmit the second resources on the carrier adjacent to the carrier transmitting the first resources.

The aspects are further directed to code for determining, at the first UE, that the at least one uplink resource from the first resources specified in the first TDD pattern is aligned with at least one uplink resource from the second resources specified in the second TDD pattern, and code for transmitting the at least one uplink resource without the guard band when alignment exists between the at least one uplink resource specified in the first TDD pattern and the at least one uplink resource specified in the second TDD pattern.

The aspects are further directed to wherein the first TDD pattern includes locations of the at least one uplink resource, at least one downlink resource, and at least one special resource in the first resources during a time period.

In an aspect of the disclosure, a user equipment (UE), comprising means for receiving from a base station (BS), a second time-division-duplexing (TDD) pattern associated with a second UE, wherein the second TDD pattern specifies second resources that are on a carrier adjacent to a carrier of the UE, means for establishing, by the first UE, a guard band on an edge of the carrier that includes at least one uplink resource from first resources specified in a first TDD pattern associated with the first UE when there is a resource type mismatch between the at least one uplink resource and second resources, and means for transmitting, to the BS, the first resources on the carrier and as specified in the first TDD pattern, including the at least one uplink resource with the guard band on the edge of the at least one uplink resource.

The aspects are further directed to means for establishing a second guard band on a portion of a specific resource from the first resources specified in the first TDD pattern, and wherein the means for the transmitting further comprise means for transmitting the portion of the specific resource with the second guard band.

The aspects are further directed to means for monitoring for the second TDD pattern that is used by the second UE to transmit the second resources on the carrier adjacent to the carrier transmitting the first resources.

The aspects are further directed to means for determining that the at least one uplink resource from the first resources specified in the first TDD pattern is aligned with at least one uplink resource from the second resources specified in the second TDD pattern, and means for transmitting the at least one uplink resource without the guard band when alignment exists between the at least one uplink resource specified in the first TDD pattern and the at least one uplink resource specified in the second TDD pattern.

The aspects are further directed to wherein the guard band reduces cross-link interference caused by the resource type mismatch.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
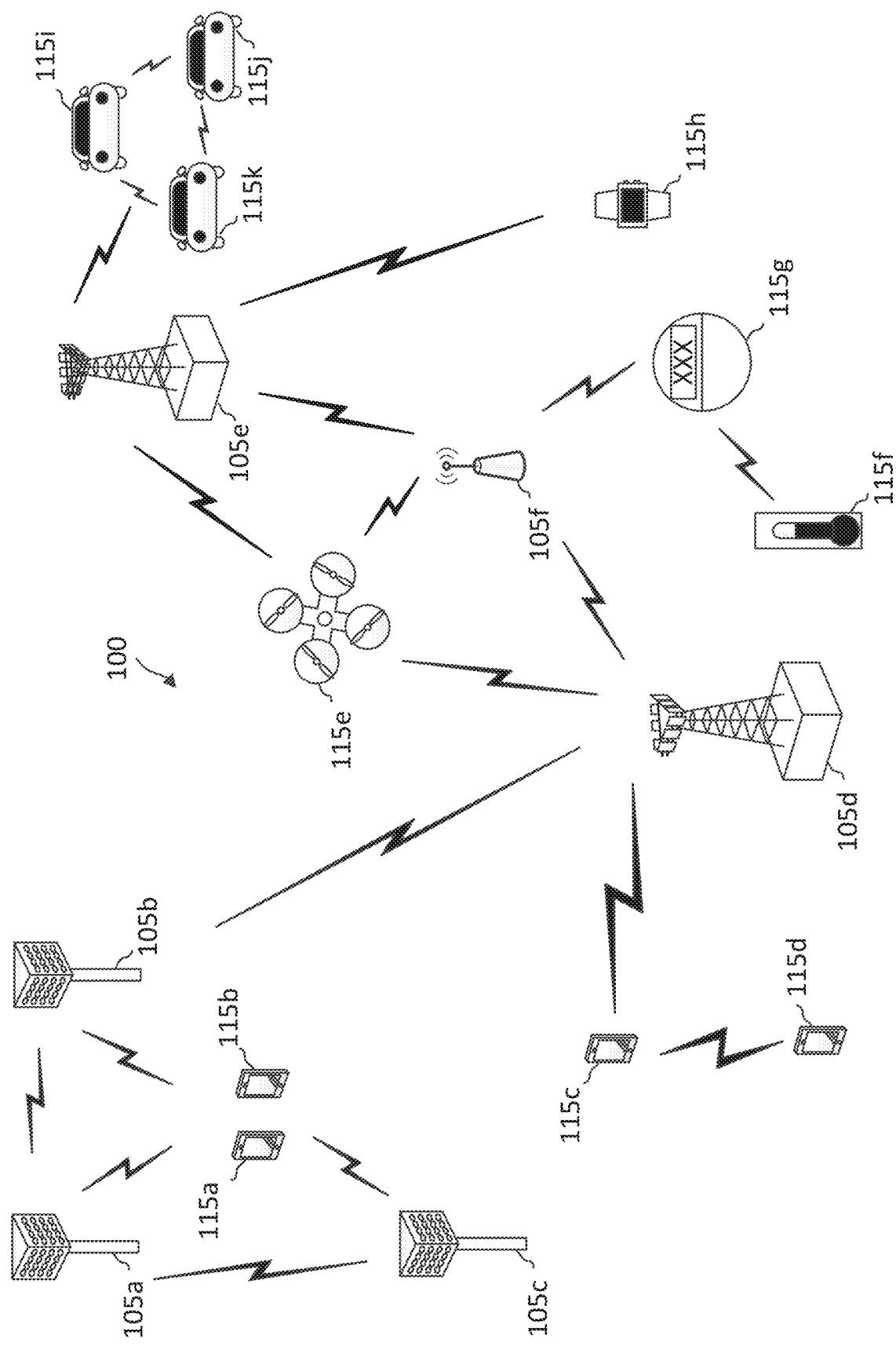
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing (SCS), may efficiently address operating diverse services across diverse spectrum and diverse deployments. For example, in various outdoor and macro coverage deployments of less than 3 GHz FDD/TDD implementations, SCS may occur with 15 kHz, for example over 5, 10, 20 MHz, and the like bandwidth (BW). For other various outdoor and small cell coverage deployments of TDD greater than 3 GHz, SCS may occur with 30 kHz over 80/100 MHz BW. For other various indoor wideband implementations, using a TDD over the unlicensed portion of the 5 GHz band, the SCS may occur with 60 kHz over a 160 MHz BW. Finally, for various deployments transmitting with mmWave components at a TDD of 28 GHz, the SCS may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms for identifying

Aspects of the present disclosure can provide several benefits.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105$d$ and 105$e$ may be regular macro BSs, while the BSs 105$a$-105$c$ may be macro BSs enabled with one of three dimension (3D), full dimension (FD), or massive MIMO. The BSs 105$a$-105$c$ may take advantage of their higher dimension MIMO capabilities to exploit 3D beamforming in both elevation and azimuth beamforming to increase coverage and capacity. The BS 105$f$ may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115$a$-115$d$ are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115$e$-115$h$ are examples of various machines configured for communication that access the network 100. The UEs 115$i$-115$k$ are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105$a$-105$c$ may serve the UEs 115$a$ and 115$b$ using 3D beamforming and coordinated spatial techniques, such as coordinated multipoint (CoMP) or multi-connectivity. The macro BS 105$d$ may perform backhaul communications with the BSs 105$a$-105$c$, as well as small cell, the BS 105$f$. The macro BS 105$d$ may also transmits multicast services which are subscribed to and received by the UEs 115$c$ and 115$d$. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115$e$, which may be a drone. Redundant communication links with the UE 115$e$ may include links from the macro BSs 105$d$ and 105$e$, as well as links from the small cell BS 105$f$. Other machine type devices, such as the UE 115$f$ (e.g., a thermometer), the UE 115$g$ (e.g., smart meter), and UE 115$h$ (e.g., wearable device) may communicate through the network 100 either directly with BSs, such as the small cell BS 105$f$, and the macro BS 105$e$, or in multi-step-size configurations by communicating with another user device which relays its information to the network, such as the UE 115$f$ communicating temperature measurement information to the smart meter, the UE 115$g$, which is then reported to the network through the small cell BS 105$f$. The network 100 may also provide additional network efficiency through dynamic, low-latency TDD/FDD communications, such as vehicle-to-vehicle (V2V) communications among the UEs 115$i$-115$k$, vehicle-to-everything (V2X) communications between a UE 115$i$, 115$j$, or 115$k$ and other UEs 115, and/or vehicle-to-infrastructure (V2I) communications between a UE 115$i$, 115$j$, or 115$k$ and a BS 105. Network 100 that offers TDD communications may be referred to as TDD network.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the SCS between adjacent subcarriers may be fixed, and the total number of subcarriers (K) may be dependent on the system BW. The system BW may also be partitioned into subbands. In other instances, the SCS and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 20. Each slot may be further divided into mini-slots. In a FDD mode, simultaneous UL transmission and DL reception may occur in a paired spectrum. For example, each slot includes a UL subframe in a UL frequency band and a DL subframe in a DL frequency band. A subframe may also be referred to as a slot. In a TDD mode, the UL transmission and DL reception occur at different time periods using the same frequency (also called unpaired spectrum). For example, a subset of the slots (e.g., DL slots) in a radio frame may be used for DL transmissions and another subset of the slots (e.g., UL slots) in the radio frame may be used for UL transmissions. In a TDD mode, there is one or more slots containing periods that can be used to switch from the resources used for DL reception to the resources used for UL transmission. The resource that can be used for switching from DL reception to UL transmission can be referred as special or flexible resource.

The DL slots and the UL slots can be further divided into several regions. For example, each DL or UL slots may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained slots. A self-contained subframe may include a portion for DL communication and a portion for UL communication. A self-contained slot can be DL-centric or UL-centric. A DL-centric subframe may include a longer duration for DL communication than for UL communication. A UL-centric subframe may include a longer duration for UL communication than for DL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB, which may be transmitted in the physical broadcast channel (PBCH). The MIB may include system information for initial network access and scheduling information for RMSI and/or OSI. After decoding the MIB, the UE 115 may receive RMSI, OSI, and/or one or more system information blocks (SIBs). The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS. In some aspects, SIB1 may contain cell access parameters and scheduling information for other SIBs.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared spectrum or unlicensed spectrum. For example, the network 100 may be an NR-unlicensed (NR-U) network operating over an unlicensed spectrum. In such an aspect, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel. In an example, the LBT may be based on energy detection. For example, the LBT results in a pass when signal energy measured from the channel is below a threshold. Conversely, the LBT results in a failure when signal energy measured from the channel exceeds the threshold. In another example, the LBT may be based on signal detection. For example, the LBT results in a pass when a channel reservation signal (e.g., a predetermined preamble signal) is not detected in the channel.

In some instances, in network 100 that is a TDD network, UEs 115 may encounter UE-to-UE cross-link interference. This may occur when UEs 115 that are associated with different TDD networks and transmit using adjacent carriers or the same carrier are next or within a specified distance from each other. When the UE-to-UE interference occurs, the quality of service provided by the UEs 115 decreases. The aspects below describe techniques for reducing the UE-to-UE cross-link interference.

Figure 2A:
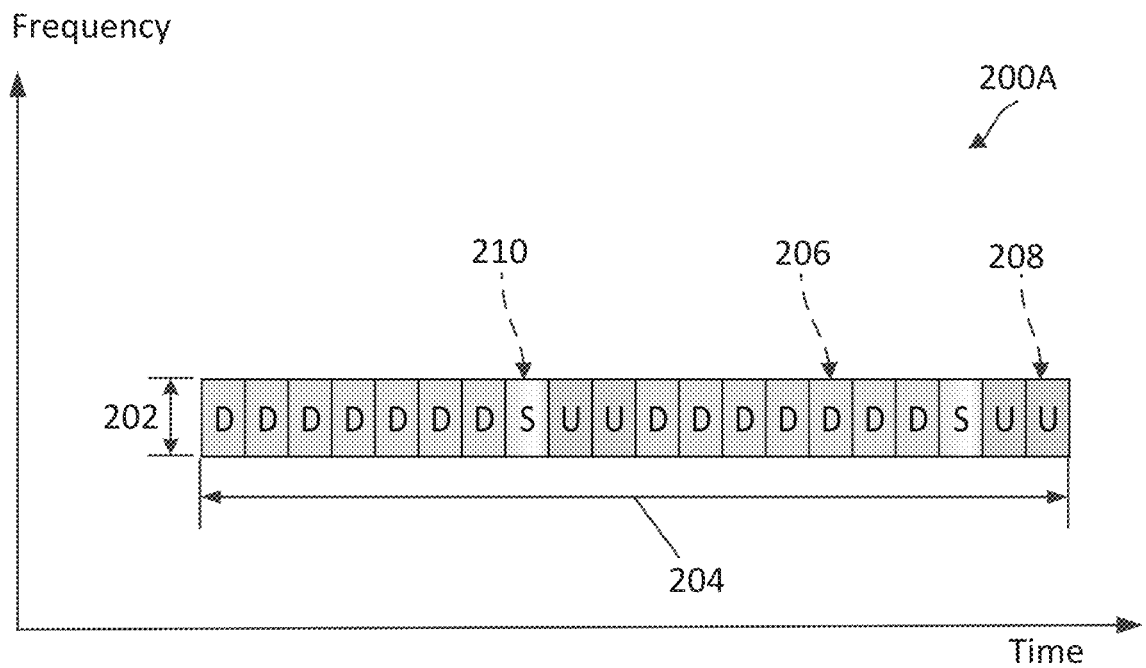
FIGS. 2A-2B illustrate time division duplexing (TDD) patterns, according to some aspects of the present disclosure.
Figure 2B:
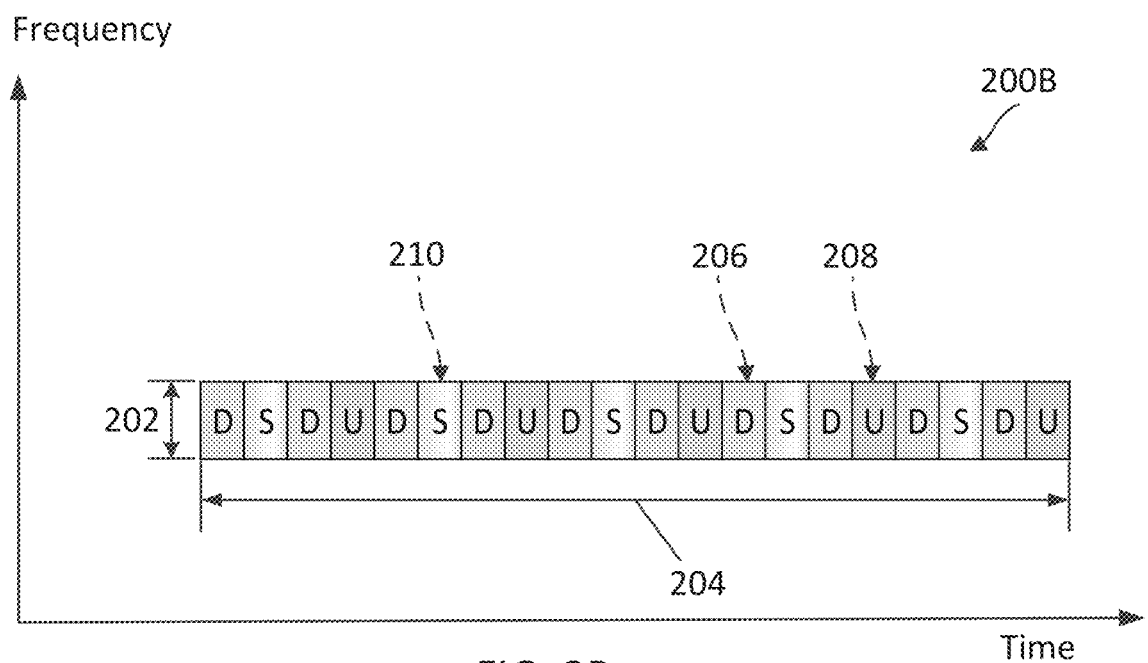

In some aspects, UEs 115 in the TDD network may transmit resources using TDD patterns. FIGS. 2A and 2B illustrate example TDD patterns 200A and 200B, according to some aspects of the present disclosure. The TDD patterns 200A and 200B may be employed by BSs such as the BSs 105 and UEs 115 in a network such as the network 100 that is a TDD network. In FIGS. 2A and 2B, the x-axis represents time in some arbitrary units, and the y-axis represents frequency in some arbitrary units. TDD patterns 200A may be transmitted using the same or different carriers.

The BSs 105 may configure UEs 115 with resources in the frequency band 202 during a time period 204. The time period 204 may refer to the periodicity of TDD patterns 200A and 200B specified in the TDD pattern. The resources may be downlink (D) resources 206 used for downlink communication, uplink (U) resources 208 used for uplink communication, and special (S) resources 210 used for guard time between two D resources 206, two U resources 208, or D resources 206 and U resources 208. The S resources 210 may include an uplink portion and a down link portion. Resources 206 208, and 210 are also known as slots.

In some aspects, a TDD patterns, such as TDD patterns 200A and 200B may be specified using TDD configuration, which indicates a pool of resources (e.g., UL slots, DL slots, special S slots) in a frequency band (e.g., the frequency band 202), time period 204 for each TDD pattern. Notably, the aspects described herein are not limited to TDD patterns 200A and 200B and may be applicable to other TDD patterns. The TDD configuration may also specify a number of D resources 206, a number of U resources 208, and a number of S resources 210 within the time period 204 and the frequency band 202.

In some aspects, TDD patterns, e.g. TDD patterns 200A and 200B may be configured for different types of traffic. For example, TDD pattern 200A may be configured for DL heavy and delay tolerant traffic, e.g. traffic associated with an Internet service. In another example, TDD pattern 200B may be configured for UL heavy traffic and delay-sensitive traffic, e.g. traffic associated with an industrial Internet-of-Things (IoT) traffic.

In some aspects, networks 100 that are TDD networks may transmit TDD patterns, e.g. TDD patterns 200A and 200B in an asynchronous manner which leads to cross-link interference. Because, the placement of different BSs 105 is static, the cross-link interference due to BSs 105 in different TDD networks may, to some extent, be controlled by the operators and suppliers of the BSs 105. However, UEs 115 are mobile and move around coverage areas covered by BSs 105 in different TDD networks. Accordingly, the UEs 115 associated with different TDD networks may operate at a distance from each other that is close enough to cause UE-to-UE cross-link interference.

Figure 2C:
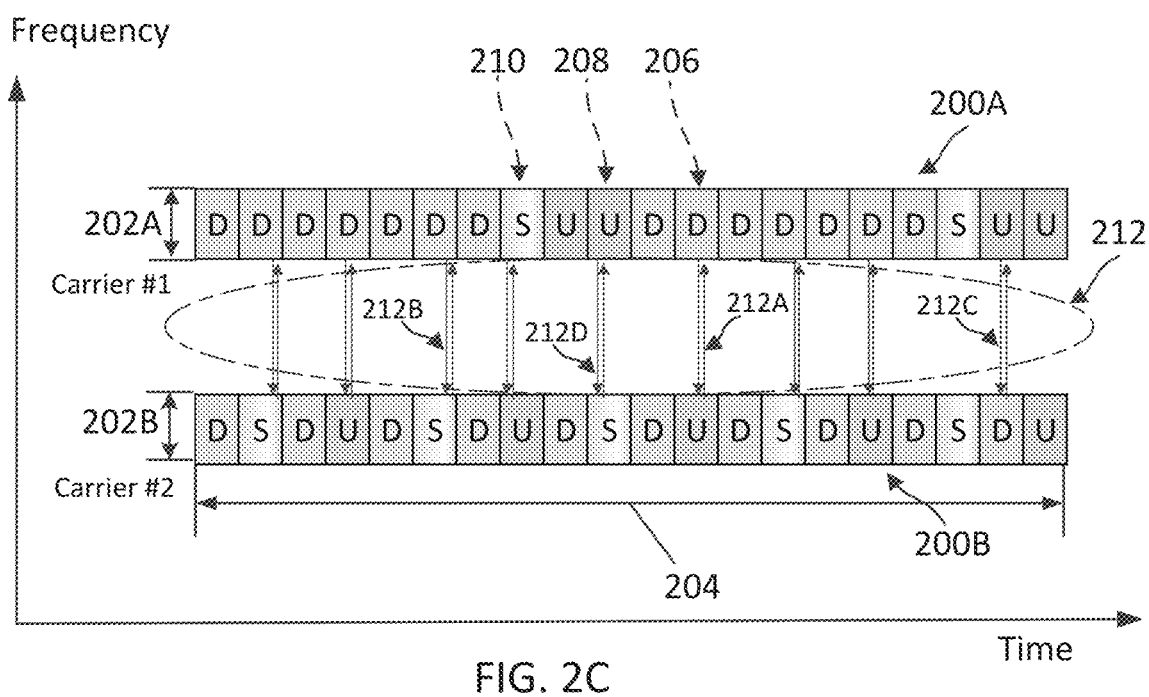
FIG. 2C illustrates user equipment (UE) to user equipment (UE) cross-link interference, according to some aspects of the present disclosure.

The UE-to-UE cross-link interference may occur when different UEs 115 transmit data using adjacent carriers that use different TDD patterns. Although the UE-to-UE cross-link interference may occur on uplink and downlink transmission, the embodiments below describe uplink UE-to-UE cross-link interference but may be equally applicable to downlink interference. FIG. 2C is a block diagram illustrating UE-to-UE cross-link interference, according to some aspects of the disclosure. FIG. 2C illustrates two TDD patterns 200, TDD pattern 200A that may be used by carrier #1 and TDD pattern 200B that may be used by carrier #2. Both TDD patterns 200A and 200B have a time period 204. Carrier #1 and carrier #2 may be adjacent carriers in the frequency spectrum.

In some instances, a first UE 115 from a first TDD network may use carrier #1 to transmit resources as specified by the TDD pattern 200A and a second UE 115 from a second TDD network may use carrier #2 to transmit resources as specified by the TDD pattern 200B. TDD pattern 200A may be transmitted using a carrier frequency period 202A and TDD pattern 200B may be transmitted using a carrier in frequency period 202B.

Figure 3A:
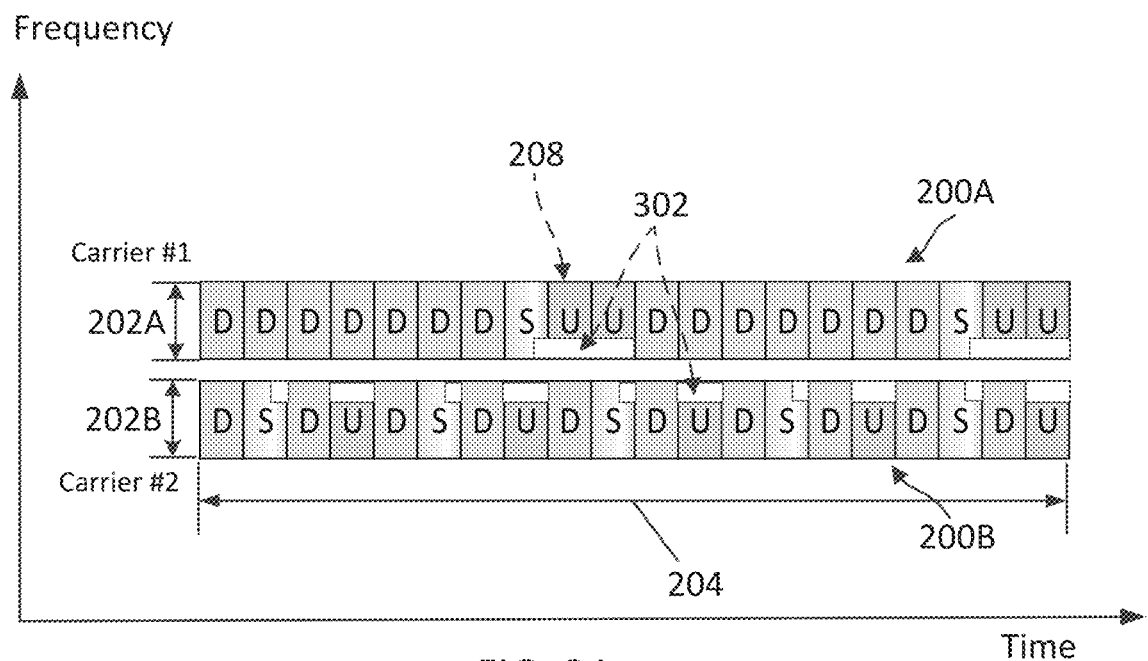
FIGS. 3A-3C illustrate diagrams for reducing user equipment to user equipment cross-link interference, according to some aspects of the present disclosure.

In some instances, cross-link interference(s) 212 may occur when there is a mis-match between the resources types in TDD patterns 200A and 200B that are transmitted on adjacent carriers at the same time or during the same time period 204. The aspects below provide examples that may cause an uplink cross-link interference 212. One example of a cross-link interference 212A may occur when carrier #1 carries D resource 206 specified in TDD pattern 200A (i.e., the BS 105 in the TDD network for carrier #1 transmits D resource 206 and the UE 115 in the same TDD network for carrier #1 receives D resource 206) and carrier #2 carries U resource 208 specified in TDD pattern 200A (i.e., the UE 115 in the TDD network for carrier #2 transmits U resource 208 and the BS 105 in the same TDD network for carrier #2 receives U resource 208) at the same time. Another example of a cross-link interference 212B may occur when carrier #1 carries D resource 206 specified in TDD pattern 200A and carrier #2 carries the S resource 210 specified in TDD pattern 200B at the same time. Another example of a cross-link interference 212C may occur when carrier #1 carries U resource 208 specified in TDD pattern 200A and carrier #2 carries D resource 206 specified in the TDD pattern 200B at the same time. Another example of a cross-link interference 212D may occur when TDD pattern 200A transmits the U resource 208 and TDD pattern 200B transmit the S resource 210 at the same time The aspects below describe various techniques that avoid or reduce the cross-link interference 212 discussed above. In one aspect, BS 105 or UE 115 or another component in the TDD network may avoid or reduce cross-link interferences by avoiding UL transmissions over a certain set of resource blocks (RBs) at the edges of the carriers that include TDD patterns 200A and/or 200B. FIG. 3A is a block diagram that includes a guard band in a TDD pattern, according to some aspects. As illustrated in FIG. 3A, guard band 302 may be incorporated into each U resource 208 that is included in TDD pattern 200A and each U resource 208 that is included in TDD pattern 200B. The size of the guard band 302 may be configured by UE 115 or BS 105. For example, BS 105 or UE 115 may configure a number of RBs that correspond to the size of the guard band 302. Further, suppose carrier #1 uses TDD pattern 200A and carrier #2 uses TDD pattern 200B. The guard band 302 is included in the U resources 208 on the adjacent edges of the carriers #1 and #2. This effectively creates a buffer between carrier #1 and carrier #2.

In some aspects, a portion of S resource 210 that is associated with the uplink transmission may also include the guard band 302.

In some aspects, guard band 302 may be incorporated into U resource 208 (and also the uplink portion of the S resource 210) specified in TDD pattern 200A, 200B in several ways. In one aspect, BS 105 or UE 115 may configure the UL bandwidth part (BWP) to exclude the certain set of RBs on the edge of the carrier. In another example, network 100 or BS 105 may avoid scheduling or configuring UL transmissions that are overlapped with the certain set of RBs on the edge of the carrier. In another example, UE 115 may drop whole or a part of a UL transmission when the UL transmission scheduled, indicated, or configured by the BS 105 overlaps with the certain set of RBs on the edge of the carrier.

In some aspects, networks 100 may use various techniques for determining when the UL cross-link interference 212 may occur. In one aspect, TDD networks 100 may store the respective TDD patterns 200 associated with the TDD networks on a server accessible to multiple TDD networks. The stored information may also include frame timing information of the TDD carrier in the TDD network. Other networks 100 may then access the server and obtain the TDD patterns 200. In this way, multiple networks 100 may share their respective TDD patterns 200.

In another aspect, networks 100 may exchange the TDD patterns 200 and the time period 204 of the TDD patterns 200 using backhaul. Backhaul may be an alternative communication channel, e.g. the Internet, 3G communication, etc., that networks 100 and/or components within networks 100 may use to share information.

In yet another aspect, one TDD network may monitor or listen for the carriers of another TDD network. For example, a TDD network, when it has no signal or channel to transmit, measures the strength of the received signal in the carrier where another TDD network may use. The first TDD network 100 may then identify the TDD patterns, e.g. TDD pattern 200A that is used by the second TDD network, and then identify the U resources 208 from the identified TDD pattern 200A. In some aspects, BS 105 that is included in the first network 100 may listen or monitor the carriers of other TDD networks 100.

In yet another aspect, UEs 115 associated with the first TDD network may listen for or monitor the interference caused by the mismatching resources 206, 208, 210 on the adjacent carriers used by the second TDD network. Such listening or monitoring the interference by the UEs 115 is possible when the UE has no transmission on the own carrier. In this way, the first TDD network may be aware of the existence of the adjacent carriers that are associated with the second TDD network. In one example, the UE 115 in the first TDD network may monitor interference of the adjacent carrier and estimate the TDD pattern 200, e.g. TDD pattern 200A, 200B of the adjacent carrier used by the second TDD network. UEs 115 may then report the estimated TDD pattern 200 to the BS 105 or another component in the first TDD network. In another example, UEs 115 may monitor interference of the adjacent carrier and report the interference fluctuation to BS 105 or another component associated with the first TDD network for analysis and identification of TDD pattern 200, e.g. TDD pattern 200A, 200B associated with adjacent carrier in the second TDD network. The report can include one or more received signal strength indicator (RSSI), reference signal received power (RSRP), reference signal received quality (RSRQ), or signal-to-interference and noise ratio (SINR) values over time, which provides the information regarding interference fluctuation over the time and representing the resources colliding during the downlink transmissions and the resources colliding during the uplink transmissions.

Figure 3B:
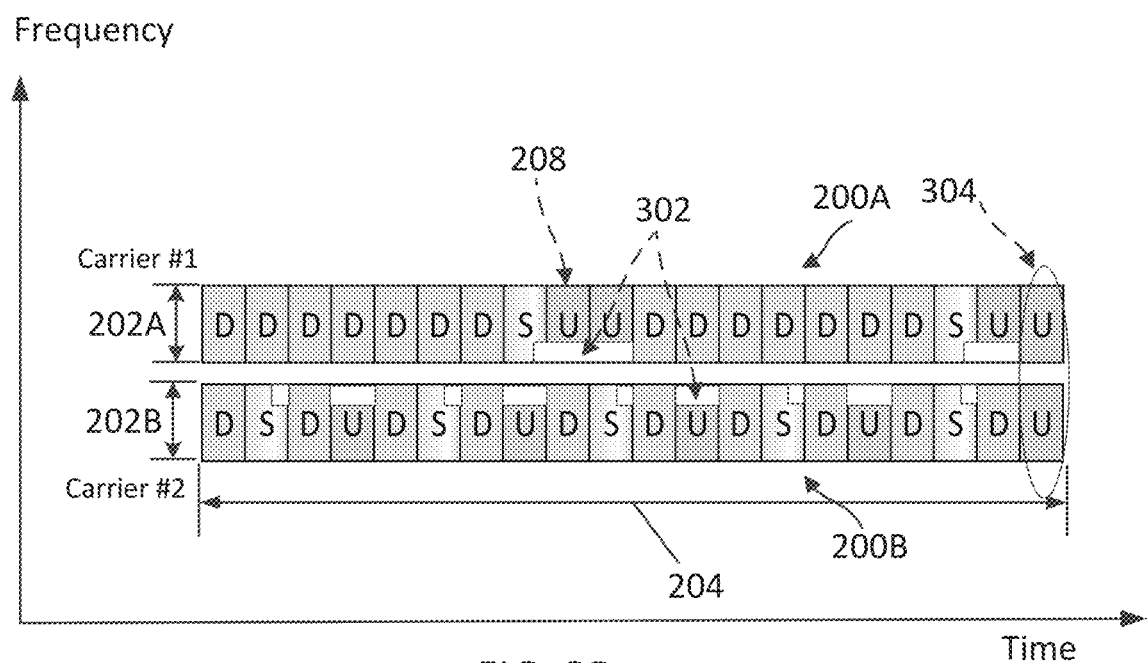

FIG. 3B is another block diagram that includes a guard band in the TDD pattern, according to some aspects of the disclosure. Similar to FIG. 3A, FIG. 3B illustrates guard bands 302 that are incorporated into each U resource 208 and the uplink portions of S resource 210 that are included in TDD patterns 200A and 200B. Unlike FIG. 3A, in FIG. 3B guard bands 302 may be created when the TDD patterns 200A and 200B of adjacent carriers #1 and #2 may cause UL cross-link interference 212. The UL cross-link interference 212 may occur when there is a mismatch between the resource types of the aligned resources, e.g. D resource 206 and U resource 208, or S resource 210 and U resource 208, transmitted on adjacent carriers #1 and #2. FIG. 3B illustrates that the guard bands 302 is not created on the edges of the U resources 208 transmitted using carrier #1 and carrier #2 that are aligned. For example, suppose carrier #1 uses TDD pattern 200A and carrier #2 uses TDD pattern 200B and carriers #1 and #2 are adjacent. FIG. 3B illustrates two U resources 208 (shown as 304) specified in TDD patterns 200A, 200B that are aligned. When two UL resources 208 are aligned, there is no (or minimal) UL cross-link interference 212, and the guard band 302 is not included for the aligned UL resources 208.

In some aspects, the UEs 115 and BSs 105 may know whether there is a potential UL cross-link interference 212 using timing and higher level parameters of the adjacent carrier. Example parameters may be TDD-UL-DL-Config-Common and TDD-UL-DL-ConfigDedicated provided by radio resource configuration (RRC) parameter set. UEs 115 may obtain the parameters using the RRC signaling in the received downlink data channel (e.g., system information) in one aspect. In another aspect, UEs 115 may monitor the downlink data channel (e.g., system information) of the adjacent carrier and identify the parameters using the system information. In yet another aspect, a DCI format, e.g. DCI format 2_0 may indicate the TDD patterns 200 to UE 115. The DCI format may be shared via backhaul signaling or identified using TDD pattern 200 detection used by BSs 105 or UEs 115 as discussed above. In this way, the UEs 115 associated with different TDD networks may determine the TDD patterns 200 of the adjacent TDD networks. In some aspects, UE 115 may be informed of the TDD patterns 200 used by the adjacent TDD network by the carrier used by UE 115 or by monitoring the adjacent carrier used by the adjacent TDD network. For example, UE 115 may be informed of the TDD pattern 200 of the adjacent carrier by the DCI format 2_0 that UE 115 receives on its own carrier. In another example, UE 115 may be informed of the TDD pattern 200 of the adjacent carrier by monitoring the DCI format 2_0 of the adjacent carrier.

Figure 3C:
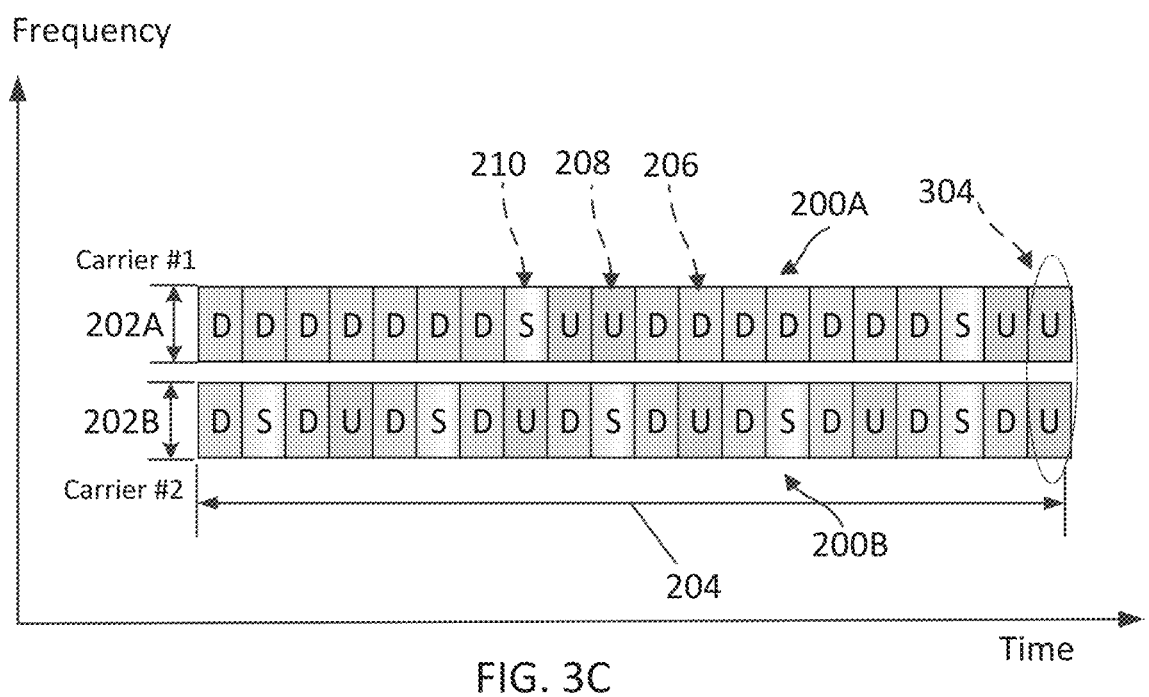

FIG. 3C is a block diagram that illustrates a technique for reducing UL cross-link interference according to some aspects of the disclosure. Unlike the aspects of FIGS. 3A-3B where guard bands 302 are incorporated into the edges of the UL resources 208 in the adjacent carriers #1 and #2, the aspects in FIG. 3C reduce power to the UL resources 208 in the adjacent carriers. For instance, UE 115 may reduce the maximum transmission power used to transmit the UL resources 208 which may reduce or eliminate UL cross-link interference. Suppose two UEs 115 that are associated with different TDD networks transmit on adjacent carriers #1 and #2, where carrier #1 uses TDD patterns 200A and carrier #2 uses TDD pattern 200B. The UEs 115 may transmit D resources 206 and S resources 210 (or a downlink portion of S resources 210) using the maximum or full power, and then lower the power to transmit U resources 208.

In some aspects, UE 115 may not reduce power for U resources 208 that are aligned in adjacent carriers (shown as 304). As discussed above, the aligned U resources 208 do not cause a UL cross-link interference. In this case, UE 115 may transmit the U resource 208 in TDD pattern 200A that is aligned with the U resource 208 in TDD pattern 200B using the maximum or full power, and U resource 208 in TDD pattern 200A that is not aligned with U resource 208 in TDD pattern 200A using the reduced power.

The UE 115 associated with the first TDD network may determine or receive the TDD patterns 200 of the adjacent carrier used by a second TDD network, as discussed above.

In some aspects, the amount of power that UEs 115 may use to transmit U resources 208 may be configured by UE 115 or by a configuration transmitted from BS 105. For example, TDD network may use a transmit power control (TPC) parameter that indicates power for transmitting U resource 208. Typically, the amount of power indicated by the TPC is less than the maximum power the UE 115 may use for transmitting resources. BS 105 may transmit the TPC parameter to UE 115 using the DCI format, e.g. TPC command field in the DCI format 0_0, 0_1, 1_0, or 1_1, or DCI format 2_2. In another example, network 100 may configure higher layer parameters for TPC. Example higher layer parameter for TPC may be a PUSCH, e.g. P0_PUSCH. BS 104 may then transmit the P0_PUSCH to UE 115. In some aspects, UE 115 may receive the TPC parameter using, e.g. DCI format or PUSCH and transmit U resource 208 using the power indicated in the TPC parameter.

Figure 4:
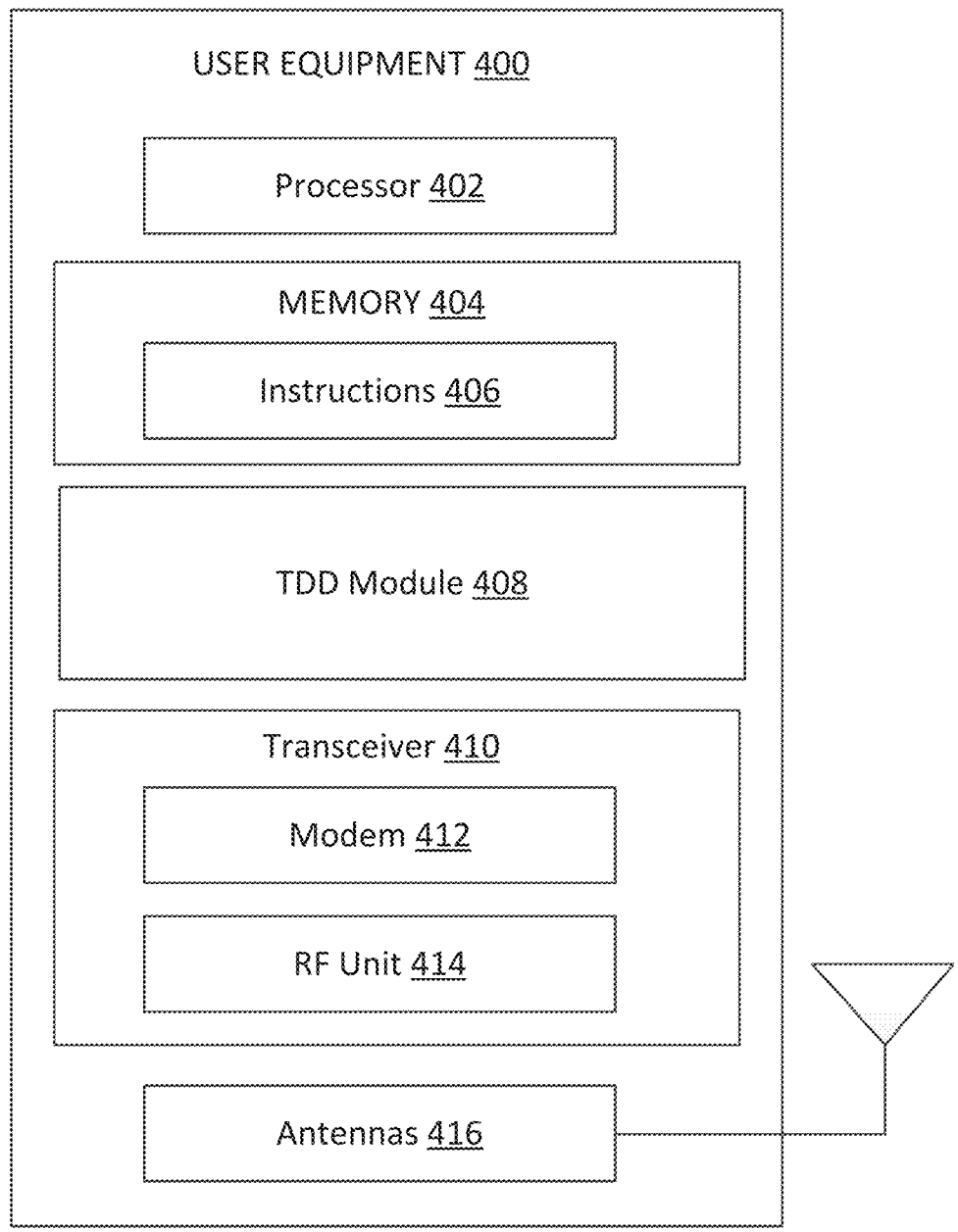
FIG. 4 is a block diagram of a user equipment according to some aspects of the present disclosure.

FIG. 4 is a block diagram of a UE 400 according to some aspects of the present disclosure. The UE 400 may be a UE 115 discussed above in FIG. 1. As shown, the UE 400 may include a processor 402, a memory 404, a TDD module 408, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 404 includes a non-transitory computer-readable medium. The memory 404 may store, or have recorded thereon, instructions 406. The instructions 406 may include instructions that, when executed by the processor 402, cause the processor 402 to perform the operations described herein with reference to the UEs 115 in connection with aspects of the present disclosure, for example, aspects of FIGS. 6-7. Instructions 406 may also be referred to as program code. The program code may be for causing a wireless communication device to perform these operations, for example by causing one or more processors (such as processor 402) to control or command the wireless communication device to do so. The terms "instructions" and "code" should be interpreted broadly to include any type of computer-readable statement (s). For example, the terms "instructions" and "code" may refer to one or more programs, routines, sub-routines, functions, procedures, etc. "Instructions" and "code" may include a single computer-readable statement or many computer-readable statements.

The TDD module 408 may determine the TDD pattern that UE 400 may use to transmit and receive information using carrier #1 in the TDD network associated with the UE 400 and also the TDD pattern that the UE 115 in a different TDD network may use to transmit and receive information using carrier #2, where carrier #1 and carrier #2 are adjacent carriers. Based on the determination, the TDD module 408 may cause the UE 400 to transmit information using the U resource that includes the guard band. In some instances, TDD module 408 may be activated when UE 115 from the different TDD network is within a configurable distance from UE 400. Alternatively, TDD module 408 may cause UE 400 to transmit information using U resource 208 using the reduced power that is specified in the TPC parameter.

The TDD module 408 may also use various techniques to identify the TDD patterns used by the adjacent carrier in a different TDD network. TDD module 408 may obtain the TDD pattern from the TDD network associated with the UE 400 or the BS 105, or by monitoring the adjacent carrier associated with the different TDD network for the TDD pattern. The TDD module 408 may be used for various aspects of the present disclosure, for example, aspects of FIGS. 1-3 and 6-7.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404. The RF unit 414 may be configured to process (e.g., perform analog to digital conversion or digital to analog conversion, etc.) modulated/encoded data (e.g., PSSCH data and/or PSCCH control information) from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices. The antennas 416 may provide the received data messages for processing and/or demodulation at the transceiver 410. The antennas 416 may include multiple antennas of similar or different designs in order to sustain multiple transmission links. The RF unit 414 may configure the antennas 416.

In some aspects, the transceiver 410 is configured to receive a TDD pattern or a TPC parameter from a BS 105 from another UE 115.

In some aspects, the UE 400 can include multiple transceivers 410 implementing different RATs (e.g., NR and LTE). In an aspect, the UE 400 can include a single transceiver 410 implementing multiple RATs (e.g., NR and LTE). In an aspect, the transceiver 410 can include various components, where different combinations of components can implement different RATs.

Figure 5:
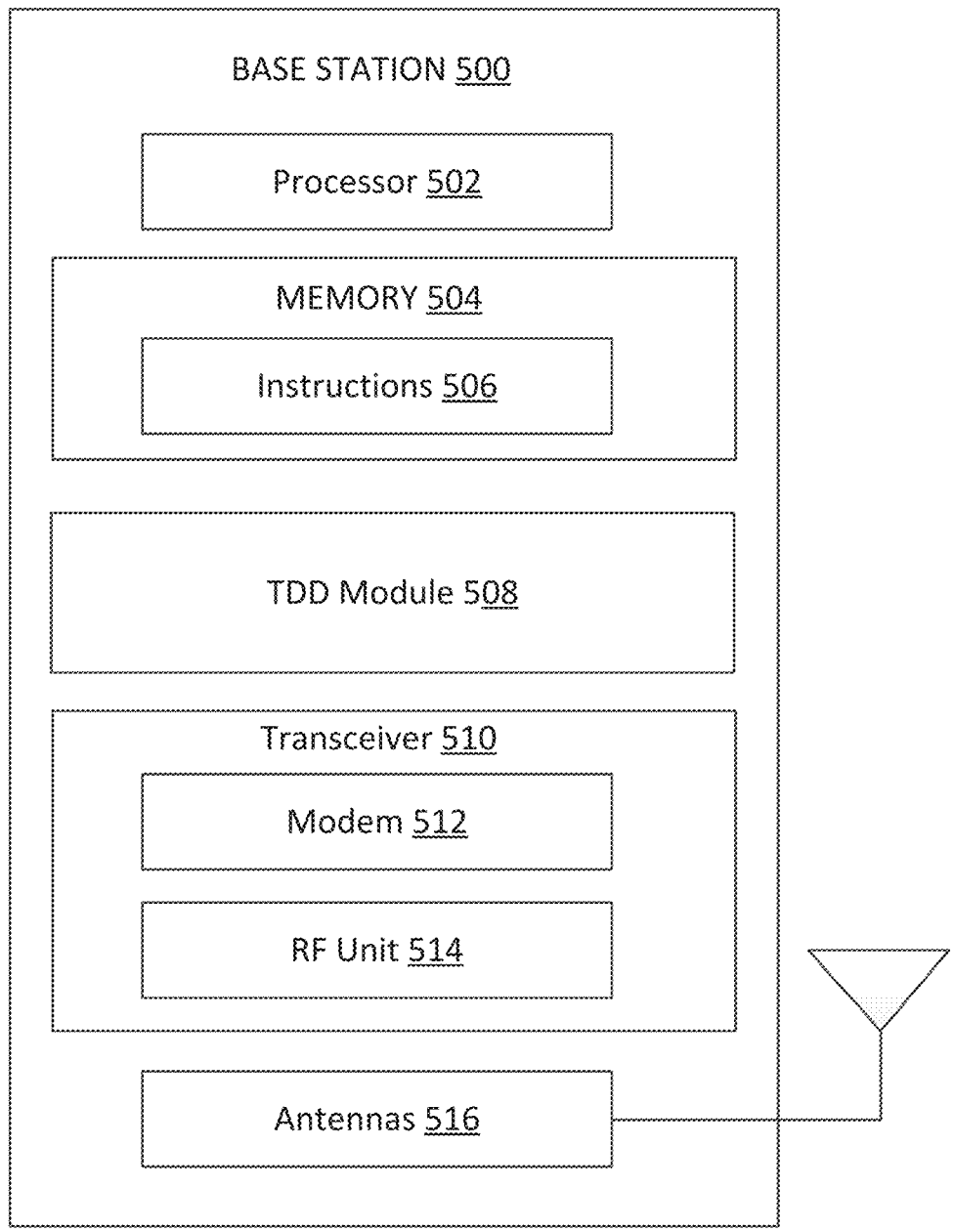
FIG. 5 is a block diagram of a base station according to some aspects of the present disclosure.

FIG. 5 is a block diagram of a BS 500 according to some aspects of the present disclosure. The BS 500 may be a BS 105 as discussed above in FIG. 1. As shown, the BS 500 may include a processor 502, a memory 504, a TDD module 508, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 6-7. Instructions 506 may also be referred to as code, which may be interpreted broadly to include any type of computer-readable statement(s) as discussed above with respect to FIG. 4.

The TDD module 508 may be implemented via hardware, software, or combinations thereof. The TDD module 508 may be implemented as a processor, circuit, and/or instructions 506 stored in the memory 504 and executed by the processor 502. In some instances, the TDD module 508 can be integrated within the modem subsystem 512. The TDD module 508 can be implemented by a combination of software components (e.g., executed by a DSP or a general processor) and hardware components (e.g., logic gates and circuitry) within the modem subsystem 512.

The TDD module 508 may be used for various aspects of the present disclosure, for example, aspects of FIGS. 1-3 and 6-7. The TDD module 508 may be configured to transmit a TDD pattern that UE 115, 400 may use to transmit resources and also to determine TDD pattern of the UEs 115 associated with a different TDD network that transmit resources on the adjacent carrier. TDD module 508 may cause the BS 105 to transmit the TDD patterns, such as a TDD pattern used by the TDD network associated with the UE 115 and the TDD pattern used by the UE 115 in the second TDD network. TDD module 508 may format parameters that may include the TDD patterns. The TDD module 508 may also transmit a TPC parameter to UE 115, 400 that indicates the power that UE 115 may use to transmit information using the uplink resources to reduce uplink cross-link interference.

As shown, the transceiver 510 may include the modem subsystem 512 and the RF unit 514. The transceiver 510 can be configured to communicate bi-directionally with other devices, such as the UEs 115 and/or 400 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data (e.g., grants, resource allocations) from the modem subsystem 512 (on outbound transmissions) or of transmissions originating from another source such as a UE 115 and/or UE 400. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115 or 400 according to some aspects of the present disclosure. The antennas 516 may further receive data messages transmitted from other devices and provide the received data messages for processing and/or demodulation at the transceiver 510. The antennas 516 may include multiple antennas of similar or different designs in order to sustain multiple transmission links.

In an example, the transceiver 510 is configured to transmit a TDD configuration by coordinating with the TDD module 508. In an aspect, the BS 500 can include multiple transceivers 510 implementing different RATs (e.g., NR and LTE). In an aspect, the BS 500 can include a single transceiver 510 implementing multiple RATs (e.g., NR and LTE). In an aspect, the transceiver 510 can include various components, where different combinations of components can implement different RATs.

Figure 6:
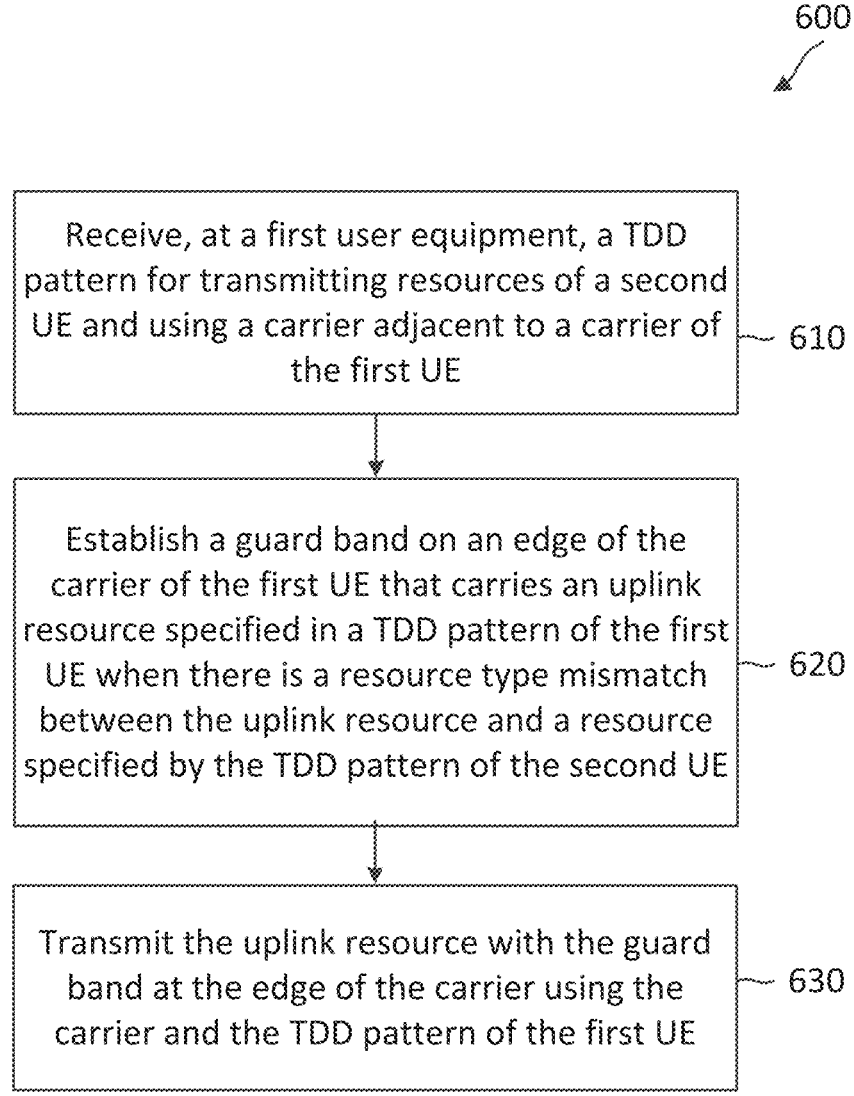
FIG. 6 is a flow diagram of a communication method according to some aspects of the present disclosure.

FIG. 6 is a flow diagram of a communication method 600 according to some aspects of the present disclosure. Steps of the method 600 can be executed by a computing device (e.g., a processor, processing circuit, and/or other suitable component) of a wireless communication device or other suitable means for performing the steps. For example, a wireless communication device, such as the UE 115 or the UE 400, may utilize one or more components, such as the processor 402, the memory 404, the TDD module 408, the transceiver 410, the modem 412, and the one or more antennas 416, to execute the steps of method 600. As illustrated, the method 600 includes a number of enumerated steps, but aspects of the method 600 may include additional steps before, after, and in between the enumerated steps. In some aspects, one or more of the enumerated steps may be omitted or performed in a different order.

At step 610, the method 600 includes receiving, by a first UE from a BS, a TDD pattern. The TDD pattern 200 may be the pattern that specifies resources, e.g. D resources 206, U resources 208, and S resources 210, the time period 204 and the frequency band 202 for a second UE 115. The D resources 206 may transmit data and information from the BS 105 to UE 115, the U resources 208 may transmit data and information from UE 115 to BS 105, and S resources 210 may guard time between D resources 206 and U resources 208. A carrier may be used to carry resources 206, 208, 210 in a pattern included in TDD pattern 200. The TDD pattern 200 received in step 610 may be TDD pattern 200 associated with the second UE 115 that is transmitting on a carrier adjacent to the carrier used by the first UE 115.

At step 620, the method 600 including, establishing, by the first UE a guard band. The guard band 302 may include RBs at the edge of the carrier that uses TDD pattern 200 of the first UE 115. Further, the guard band 302 may be included in U resources 208 specified by the TDD pattern 200 and the uplink portion of S resources 210. The first UE 115 or BS 105 may specify the size of the guard band 302 by configuring a number of RBs that may be included in the guard band 302. The first UE 115 may establish the guard band 302 when the first UE 115 identifies a second UE 115 from a different TDD network that is transmitting on an adjacent carrier and uses the TDD pattern 200 received in step 610. The UE 115 may establish the guard band 302 by excluding scheduling or configuring information on the portion of the U resource 208 that is covered by the guard band 302. The guard band 302 may reduce UL cross-link interference 212 between adjacent carriers when there is a resource type mismatch between the aligned resources in the TDD patterns 200 of the first UE 115 and the second UE 115. For example, when the first UE 115 identifies the U resource 208 in the TDD pattern 200 used by the first UE 115 that is aligned with the D resource 306 or S resource 210 in the TDD pattern 200 used by the second UE 115, the first UE 115 may establish the guard band 302. In some instances, the first UE 115 may not establish the guard band 302 in the U resources 208. This may occur when the first UE 115 identifies the TDD pattern used by the second UE 115, and the U resources 208 specified by the TDD patterns 200 associated with the first and second UEs 115 are alighted.

At step 630, the method 600 includes transmitting, by the first UE to the BS 105, the resources using the carrier and the pattern specified by the TDD pattern 200 associated with the first UE 115. The first UE 115 may transmit resources, including the U resources 208, and in some instances S resources 210 together with the guard band. In some instances, when there is a match between U resources 208 of the TDD patterns 200 of the first UE 115 and the second UE 115, the first UE 115 may not include the guard band on the U resources 208.

Figure 7:
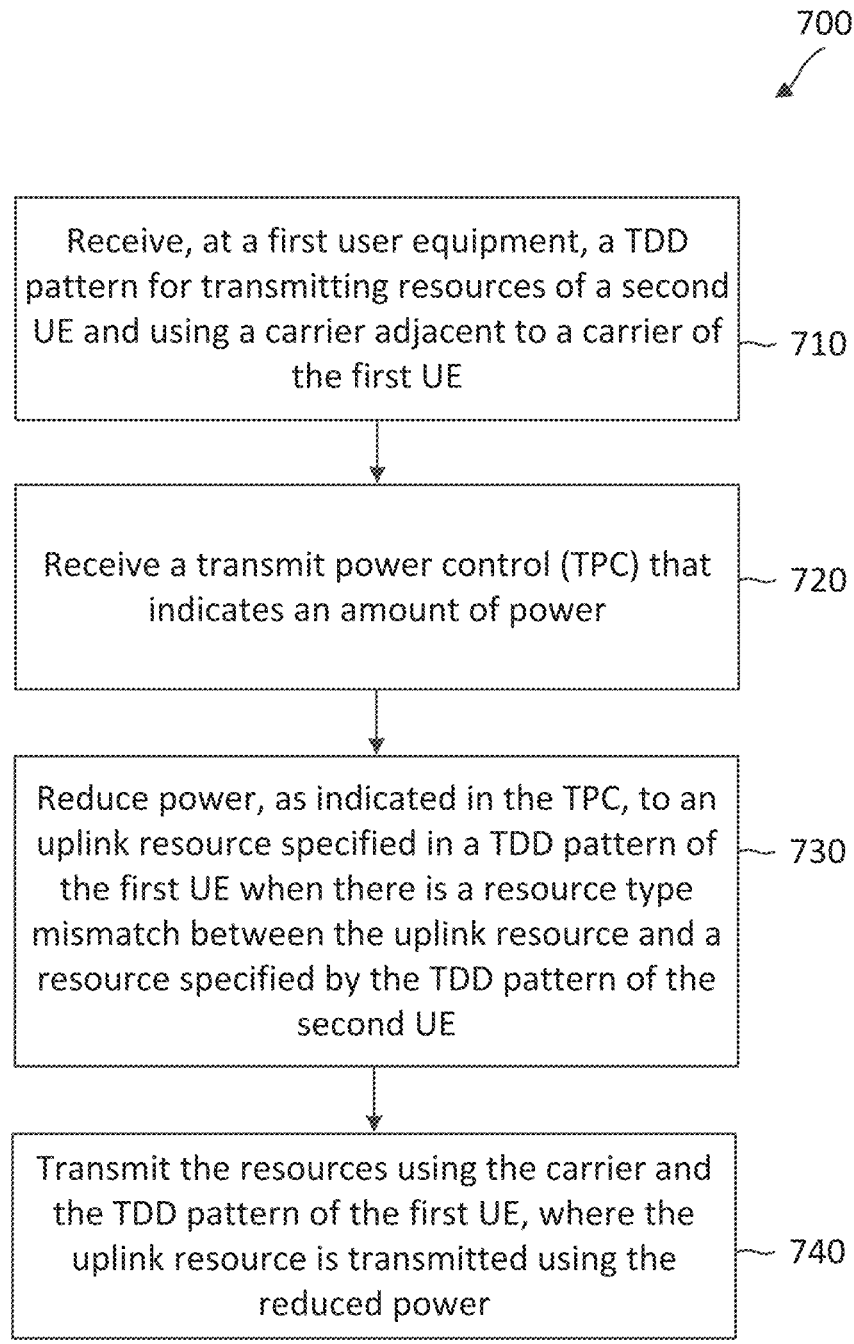
FIG. 7 is a flow diagram of a communication method according to some aspects of the present disclosure.

FIG. 7 is a flow diagram of a communication method 700 according to some aspects of the present disclosure. Steps of the method 700 can be executed by a computing device (e.g., a processor, processing circuit, and/or other suitable component) of a wireless communication device or other suitable means for performing the steps. For example, a wireless communication device, such as the UE 115 or the UE 400, may utilize one or more components, such as the processor 402, the memory 404, the TDD module 408, the transceiver 410, the modem 412, and the one or more antennas 416, to execute the steps of method 700. As illustrated, the method 700 includes a number of enumerated steps, but aspects of the method 700 may include additional steps before, after, and in between the enumerated steps. In some aspects, one or more of the enumerated steps may be omitted or performed in a different order.

At step 710, the method 700 includes receiving, by a first UE from a BS, a TDD pattern. The TDD pattern 200 may be the pattern that specifies resources, e.g. D resources 206, U resources 208, and S resources 210, the time period 204 and the frequency band 202 of the second UE 115 that is transmitting on a carrier adjacent to the carrier of the first UE 115. The D resources 206 may transmit data and information from the BS 105 to UE 115, the U resources 208 may transmit data and information from UE 115 to BS 105, and S resources 210 may guard time between D resources 206 and U resources 208. A carrier may be used to carry resources 206, 208, 210 in a pattern included in TDD pattern 200.

At step 720, the method 700 include receiving, by the first UE from the BS, a transmit power command (TPC). The TPC indicates the amount of power the first UE 115 may use to transmit information using the U resource 208. The TPC command may be included in the TPC command field in the DCI format 0_0, 0_1, 1_0, or 1_1, or DCI format 2_2. The TPC command may also be included in a higher level parameter, such as the P0_PUSCH At step 730, the method 700 includes, reducing, by the first UE, the power to the uplink resources. The location of the uplink resources 208 may be specified in the TDD pattern 200 of the first UE. The first UE 115 may reduce power when the first UE 115 identifies a second UE 115 from a different TDD network that is transmitting on an adjacent carrier and the TDD patterns 200 indicate that there is a mismatch of resource types. For example, the first UE 115 may reduce power when there is an alignment between the U resource 208 of the first UE 115 and the D resource 206 or S resource 210 of the second UE 115. The power may be reduced from the full or maximum power to a power specified in the TPC. In some instances, the first UE 115 may not reduce power when the first UE 115 identifies the TDD pattern used by the second UE 115 in a different TDD network, and the U resources 208 in the TDD patterns associated with the first UE 115 and the second UE 115 are alighted.

At step 740, the method 700 includes transmitting, by the first UE to the BS 105 resources using the carrier and as specified in the TDD pattern. The first UE 115 may transmit the resources to BS 105 using the carrier and as specified in the TDD pattern 200. Further, the U resources 208 may be transmitted using power specified in the TPC.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method for avoiding cross-link interference in a wireless communication system, comprising:
   receiving, by a first user equipment (UE) from a base station (BS), a second time-division-duplexing (TDD) pattern associated with a second UE, wherein the second TDD pattern specifies second resources that are on a carrier adjacent to a carrier of the first UE;
   establishing, by the first UE, a guard band on an edge of the carrier of the first UE, wherein the carrier of the first UE includes at least one uplink resource from first resources specified in a first TDD pattern associated with the first UE when there is a resource type mismatch between the at least one uplink resource that is aligned with at least one second resource in the second resources; and
   transmitting, by the first UE to the BS, the first resources on the carrier and as specified in the first TDD pattern, including the at least one uplink resource with the guard band on the edge of the carrier carrying the at least one uplink resource.

2. The method of claim 1, further comprising:
   establishing, by the first UE, a second guard band on a portion of a specific resource from the first resources specified in the first TDD pattern; and
   wherein the transmitting further comprises transmitting the portion of the specific resource with the second guard band.

3. The method of claim 1, further comprising:
   monitoring, at the first UE, for an indicator that includes the second TDD pattern that is used by the second UE to transmit the second resources on the carrier adjacent to the carrier transmitting the first resources.

4. The method of claim 1, wherein the establishing further comprises:
   determining, at the first UE, that the at least one uplink resource from the first resources specified in the first TDD pattern is aligned with at least one uplink resource from the second resources specified in the second TDD pattern; and
   transmitting the at least one uplink resource without the guard band when alignment exists between the at least one uplink resource specified in the first TDD pattern and the at least one uplink resource specified in the second TDD pattern.

5. The method of claim 1, wherein the first TDD pattern includes locations of the at least one uplink resource, at least one downlink resource, and at least one special resource in the first resources during a time period.

6. A user equipment (UE), comprising:
   a transceiver configured to:
      receive, from a base station (BS), a second time-division-duplexing (TDD) pattern associated with a second UE, wherein the second TDD pattern specifies second resources that are on a carrier adjacent to a carrier of the UE; and
      transmit, to the BS, first resources on the carrier of the UE and as specified in a first TDD pattern, including at least one uplink resource with a guard band on an edge of the carrier carrying the at least one uplink resource; and a processor configured to:
establish the guard band on the edge of the carrier of the UE, wherein the carrier of the UE carries the at least one uplink resource from the first resources specified in the first TDD pattern associated with the UE when there is a resource type mismatch between the at least one uplink resource and at least one resource of the second resources.

7. The UE of claim 6, wherein the processor is further configured to establish a second guard band on a portion of a specific resource from the first resources specified in the first TDD pattern; and
to transmit the first resources the transceiver is further configured to transmit the portion of the specific resource with the second guard band.

8. The UE of claim 6, wherein the processor is further configured to:
monitor for an indicator that includes the second TDD pattern that is used by the second UE to transmit the second resources on the carrier adjacent to the carrier transmitting the first resources.

9. The UE of claim 6, wherein the processor is further configured to:
determine that the at least one uplink resource from the first resources specified in the first TDD pattern is aligned with at least one uplink resource from the second resources specified in the second TDD pattern; and
to transmit the first resources, the transceiver is further configured to transmit the at least one uplink resource without the guard band when alignment exists between the at least one uplink resource specified in the first TDD pattern and the at least one uplink resource specified in the second TDD pattern.

10. The UE of claim 6, wherein the guard band reduces cross-link interference caused by the resource type mismatch.

11. A non-transitory computer-readable medium having program code recorded thereon, the program code comprising:
code for receiving, by a first user equipment (UE) from a base station (BS), a second time-division-duplexing (TDD) pattern associated with a second UE, wherein the second TDD pattern specifies second resources that are on a carrier adjacent to a carrier of the first UE;
code for establishing, by the first UE, a guard band on an edge of the carrier of the first UE, wherein the carrier of the first UE includes at least one uplink resource from first resources specified in a first TDD pattern associated with the first UE when there is a resource type mismatch between the at least one uplink resource and at least one resource in the second resources; and
code for transmitting, by the first UE to the BS, the first resources on the carrier and as specified in the first TDD pattern, including the at least one uplink resource with the guard band on the edge of the carrier carrying the at least one uplink resource.

12. The non-transitory computer-readable medium of claim 11, further comprising code for establishing, by the first UE, a second guard band on a portion of a specific resource from the first resources specified in the first TDD pattern; and wherein the code for transmitting further comprises code for transmitting the portion of the specific resource with the second guard band.

13. The non-transitory computer-readable medium of claim 11, further comprising:
code for monitoring, at the first UE, for an indicator that includes the second TDD pattern that is used by the second UE to transmit the second resources on the carrier adjacent to the carrier transmitting the first resources.

14. The non-transitory computer-readable medium of claim 11, further comprising:
code for determining, at the first UE, that the at least one uplink resource from the first resources specified in the first TDD pattern is aligned with at least one uplink resource from the second resources specified in the second TDD pattern; and
code for transmitting the at least one uplink resource without the guard band when alignment exists between the at least one uplink resource specified in the first TDD pattern and the at least one uplink resource specified in the second TDD pattern.

15. The non-transitory computer-readable medium of claim 11, wherein the first TDD pattern includes locations of the at least one uplink resource, at least one downlink resource, and at least one special resource in the first resources during a time period.

16. A user equipment (UE), comprising:
means for receiving from a base station (BS), a second time-division-duplexing (TDD) pattern associated with a second UE, wherein the second TDD pattern specifies second resources that are on a carrier adjacent to a carrier of the UE;
means for establishing, by the UE, a guard band on an edge of the carrier of the UE, wherein the carrier of the UE includes at least one uplink resource from first resources specified in a first TDD pattern associated with the first UE when there is a resource type mismatch between the at least one uplink resource and at least one resource in the second resources; and
means for transmitting, to the BS, the first resources on the carrier and as specified in the first TDD pattern, including the at least one uplink resource with the guard band on the edge of the at least one uplink resource.

17. The UE of claim 16, further comprising:
means for establishing a second guard band on a portion of a specific resource from the first resources specified in the first TDD pattern; and
wherein the means for the transmitting further comprise means for transmitting the portion of the specific resource with the second guard band.

18. The UE of claim 16, further comprising:
means for monitoring for the second TDD pattern that is used by the second UE to transmit the second resources on the carrier adjacent to the carrier transmitting the first resources.

19. The UE of claim 16, further comprising:
means for determining that the at least one uplink resource from the first resources specified in the first TDD pattern is aligned with at least one uplink resource from the second resources specified in the second TDD pattern; and
means for transmitting the at least one uplink resource without the guard band when alignment exists between the at least one uplink resource specified in the first TDD pattern and the at least one uplink resource specified in the second TDD pattern.

20. The UE of claim 16, wherein the guard band reduces cross-link interference caused by the resource type mismatch.

\* \* \* \* \*